United States Patent [19]

Walker et al.

[11] 3,949,250

[45] Apr. 6, 1976

[54] ROTARY ACTUATORS

[75] Inventors: Michael Edward Walker, Redditch; Peter Frank Scott, Kingston-upon-Thames, both of England

[73] Assignee: C.A.V. Limited, Birmingham, England

[22] Filed: Mar. 11, 1974

[21] Appl. No.: 450,110

[30] Foreign Application Priority Data

Mar. 21, 1973 United Kingdom............... 13570/73

[52] U.S. Cl. .................... 310/36; 335/272; 310/168

[51] Int. Cl.[2] ........................................... H02K 33/00

[58] Field of Search ................................ 310/36–39, 310/190–193, 111, 168, 162, 163, 164; 335/272, 229, 230, 279

[56] References Cited

UNITED STATES PATENTS

| | | | |
|---|---|---|---|
| 2,767,357 | 10/1956 | Naybor | 335/272 |
| 3,171,049 | 2/1965 | Jarret et al. | 310/168 |
| 3,329,916 | 7/1967 | Carson | 310/38 X |

*Primary Examiner*—Donovan F. Duggan
*Attorney, Agent, or Firm*—Holman & Stern

[57] ABSTRACT

A rotary actuator comprises a stator structure defining a magnetisable pole piece and an angularly movable rotor structure which defines a pole element. The pole piece and pole element form part of a magnetic circuit and a winding is provided about a portion of the magnetic circuit defined by the rotor and stator structures. The faces of the pole piece or pole element which are presented to each other are provided with a slot or a cutaway portion which extends along at least part of the circumferential length of the face whereby a desired torque/angle characteristic is obtained.

11 Claims, 3 Drawing Figures

ROTARY ACTUATORS

This invention relates to rotary actuators.

According to the invention, a rotary actuator comprises in combination, a stator structure defining a magnetisable pole piece having a pole face, an angularly movable rotor structure formed from magnetisable material, the rotor structure defining a pole element, having a pole face, the pole piece and pole element forming part of a magnetic circuit, a winding surrounding a portion of the magnetic circuit and through which electric current can be passed, the rotor structure being moved angularly by the magnetic field in a direction to reduce the reluctance of the magnetic circuit of the actuator, one of said faces which are presented to each other being provided with a slot or cut away portion extending along at least part of the circumferential length of the face, whereby a desired torque/angle characteristic is obtained.

Conveniently said slot is formed in the face of the rotor pole element.

Preferably, said slot is formed by angular displacement of laminations constituting the pole element and/or pole piece, with respect to each other.

Alternatively, said slot is formed by machining material from a lamination stack constituting the pole element and/or pole piece.

Conveniently where said slot is required to be of non-uniform depth the slot is formed by machining.

Preferably, where the torque characteristic of the actuator is substantially constant as the rotor moves to reduce the reluctance of the magnetic circuit, the slot is of substantially uniform depth and has maximum width at minimum overlap of the pole element and pole piece, tapering to provide a minimum width when the pole element and pole piece are aligned.

Conveniently said minimum width of slot is zero.

Alternatively, where the torque characteristic is constant with angle, the width of the slot is substantially uniform while the depth of the slot has maximum dimension at minimum overlap of the pole element and pole piece, tapering to provide a minimum depth when the pole element and pole piece are aligned.

Conveniently said minimum depth of slot is zero.

Examples of a rotary actuator in accordance with the invention will now be described with reference to the accompanying drawings, in which.

Figure 1:
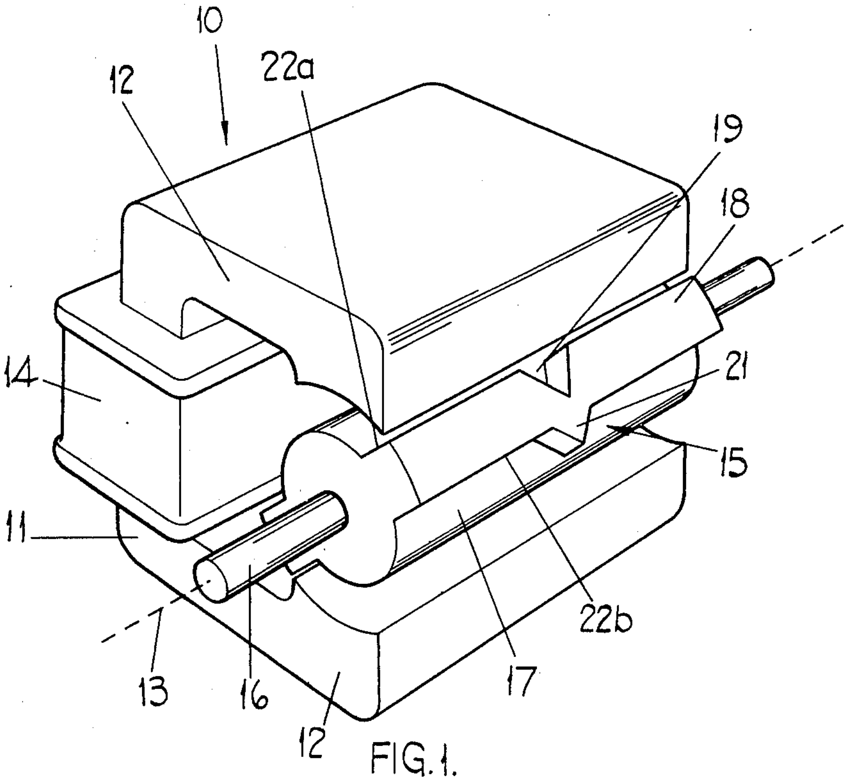
FIGS. 1 and 3 are perspective diagrammatic views of actuators.
Figure 2:
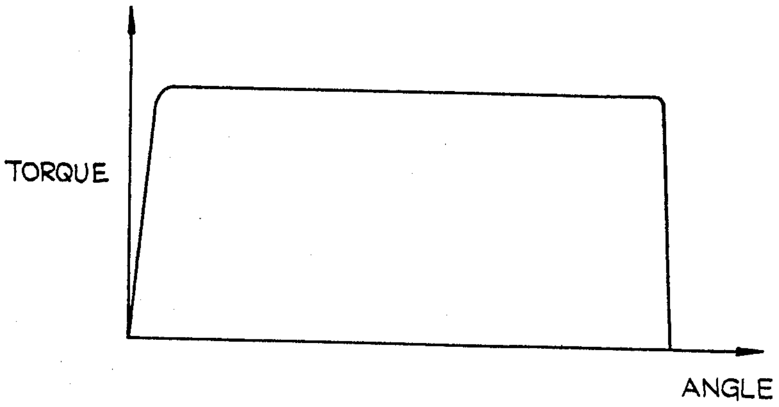
FIG. 2 shows the torque/angle characteristic.

Referring to the drawings, the actuator comprises a stator structure 10 which includes a yoke 11 defining in the particular example, a pair of opposed pole pieces 12. The presented faces of the pole pieces are curved about a central axis 13. The yoke 11 and the pole pieces 12 are formed as a stack of laminations, the shape of each lamination being substantially that of a letter C. Moreover, surrounding the limb 11 is a winding 14 through which uni-directional electric current can be passed so as to polarise the pole pieces to opposite polarity. The current flowing in the winding 14 may be continuous or of a pulsed nature.

The rotary actuator also includes a rotor structure 15 which is mounted upon a shaft 16 coincident with the axis 13. Conveniently, the shaft is steel. The main body 17 or core of the rotor structure is of cylindrical form and comprises a plurality of laminations. By suitable shaping of the laminations, in the particular example a pair of opposed pole elements 18 project from the surface of the main body portion 17, the faces of the pole elements which are directed towards the pole pieces 12 being curved about the axis 13. The airgap between the faces of the pole elements and the faces of the pole pieces is constant and as small as is practicably possible. In use, when an electric current is passed through the coil 14, the magnetic flux generated will tend to move the rotor structure angularly about the axis 13 in a direction to reduce the reluctance of the overall magnetic circuit of the actuator. With the rotor structure in the position which it is shown in the drawing, the angular movement will be in an anti-clockwise direction, viewed in direction of arrow X.

The faces of the pole elements 18 which are presented to the pole pieces 12 are provided with slots 19 having a maximum width at minimum overlap of the pole elements 18 and pole pieces 12, and tapering to provide a minimum or zero width slot when the pole elements and pole pieces are aligned. The slots are formed by displacing the laminations of the pole elements forming the rotor structure angularly with respect to each other. In the example shown, one slot 19 is shown in each pole element 18, however, several such slots may be provided.

In the particular example the overall diameter of the rotor is 48 mm and the axial length of the pole elements and pole pieces is 48 mm. A single slot 19 in each pole element has a maximum width of 18 mm tapering to 1.7 mm forming straight-sided V-slots over 50° of circumference of the pole elements which themselves extend over 60° of circumference. The air gap is 0.15 mm and a substantially constant torque of 16 Kgm.cm was obtained over an angle of movement of 50°. The V-slot is symmetrically disposed on the face of the pole element. It will be noted that since the V-slots are formed by angular displacement of the laminations, corresponding V projections 21 are formed at the trailing edges of the pole elements. These can be removed if desired, but in the example they have been retained since they have little effect upon the torque characteristic. The depth of the slots is uniform over a substantial portion of its circumferential length since the slotting is achieved by angular displacement of the laminations forming the rotor. At its narrower end, however, the slot is of reducing depth because the sides of the pole elements are not radially disposed.

It will be appreciated that the desired torque characteristic may be obtained by displacing laminations at the ends of the rotor to provide cut away portions at the axial extremities of the pole elements. Whichever way is chosen it is preferred that the change in effective axial length of the pole element with the angle of displacement follows substantially that quoted in the particular example.

Figure 3:
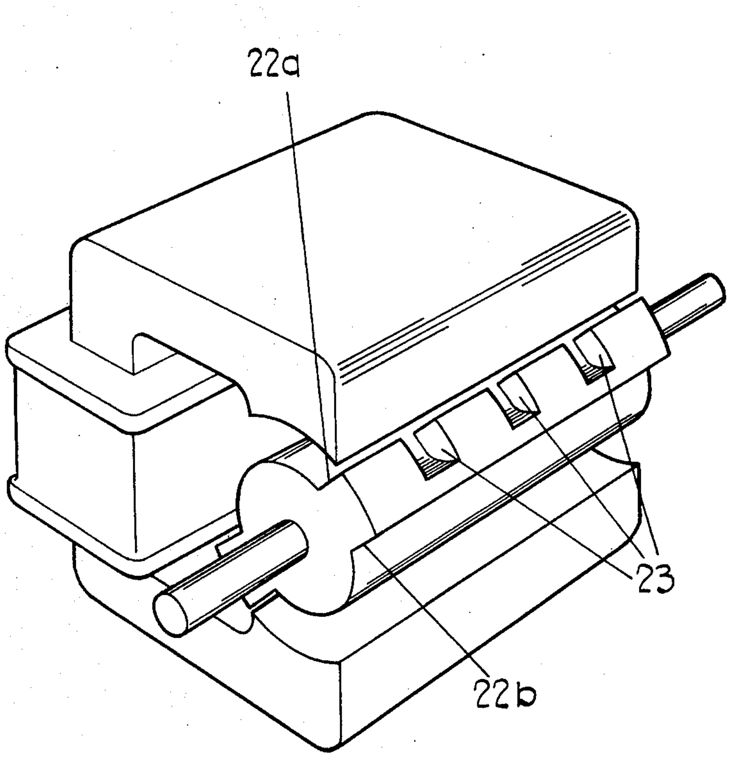

In the example shown in FIG. 3 the faces of the pole elements which are presented to the pole pieces are provided with a plurality of slots 23 and it will be seen from the drawing that the slots 23 extend from the leading edges of the pole elements and the depth of the slots decreases towards the trailing edges of the elements and also the slots terminate short of the trailing edges. As will be seen form the drawing, three slots are provided. However, this number may be increased, and further as shown in the drawings, the slots are parallel to each other and at right angles to the axis of angular movement of the rotor structure. The slots may be inclined and of varying depths throughout their length.

In the particular example shown in FIG. 3 the depth of each slot 23 is a maximum at minimum overlap of the pole elements and pole pieces, tapering to provide a minimum depth when the pole elements and pole pieces are aligned. The axial length and diameter of the rotor is that of the first example while the three slots formed by machining have a width of 3 mm and a length occupying 35° of rotor movement, with the remaining 25° of pole element being uninterrupted. The first 20° of slot from the leading edge of the pole element is of constant depth equal to the full depth of the pole element, while the remaining 15° is formed by milling a circular arc forming a point of inflexion with the base of the slot so that the depth of slot varies over the 15° from maximum to zero. In both examples the depth of the pole element is 4 mm.

The provision of the slots 19 has the effect of reducing the effective overall length of the pole element over that portion thereof which is slotted.

Whilst in the examples described, the slots are formed in the pole elements 18, it will be understood that the pole faces 12 may be provided with the slots or both the faces of the pole pieces 12 and pole elements may be slotted or have displaced laminations to obtain the desired operating characteristics.

Preferably the walls 22*a*, 22*b* defining the extremities of the pole elements in a circumferential direction prior to the production of the slots, are parallel to the axial plane of symmetry of the pole elements.

It will be appreciated that although in the particular examples, the torque characteristic required from the actuator is one which is substantially constant over the required angle of movement, by suitable choice of slot dimensions a wide range of torque/angle characteristics may be obtained. Also, while in the particular examples the axial length of the rotor pole elements is equal to the axial length of the stator pole pieces, it will be appreciated that the axial length of the rotor pole elements could be less than the axial length of the stator pole pieces. However, while the desired torque shape can be obtained by shortening the pole elements, the maximum torque obtainable will be reduced and hence, it is preferred that the pole elements and pole pieces should be of equal axial length. Moreover, the slots may extend the full circumferential length of the faces of the pole elements or pole pieces. It being understood that the width or depth of the slot may vary throughout its circumferential length to provide the desired torque/angle characteristic.

We claim:

1. A rotary actuator comprising in combination a stator structure defining a pair of diametrically opposed magnetisable pole pieces each having a pole face, an angularly movable rotor structure formed from magnetisable material, the rotor structure defining a pair of substantially diametrically opposed pole elements each having a pole face, the pole pieces and pole elements forming part of a magnetic circuit, a winding surrounding a portion of the magnetic circuit and through which electric current can be passed, the rotor structure being moved angularly by the magnetic field in a direction to reduce the reluctance of the magnetic circuit of the actuator, one of said pole faces of each pair which are presented to each other being provided with a slot extending along at least part of the circumferential length of the face, said slot defining means for obtaining a desired torque/angle characteristic, said desired torque/angle characteristic being substantially constant as said rotor moves to reduce the reluctance of said magnetic circuit, said slot being of substantially uniform depth and having maximum width at minimum overlap of its respective pole element and said pole piece and tapering to provide minimum width when said pole element and said pole piece are aligned.

2. An actuator as claimed in claim 1 in which said slot is of uniform depth throughout its circumferential length.

3. An actuator as claimed in claim 1 in which said slot is of varying depth throughout its circumferential length.

4. An actuator as claimed in claim 1 in which said rotor structure comprises a stack of laminations.

5. An actuator as claimed in claim 4 in which the slots in the faces of the pole elements are of constant depth and are formed by angular displacement of some of the laminations in the stack.

6. An actuator as claimed in claim 4 in which said slots are of unequal depth throughout their circumferential length.

7. An actuator as claimed in claim 5 in which said slots extend only part way over the circumferential length of the faces of the pole elements.

8. An actuator as claimed in claims 5 in which said slots extend the full circumferential length of the faces of the pole elements.

9. An actuator as claimed in claim 1 in which the minimum width of the slot is zero.

10. A rotary actuator comprising in combination a stator structure defining a pair of diametrically opposed magnetisable pole pieces each having a pole face, an angularly movable rotor structure formed from magnetisable material, the rotor structure defining a pair of substantially diametrically opposed pole elements each having a pole face, the pole pieces and pole elements forming part of a magnetic circuit, a winding surrounding a portion of the magnetic circuit and through which electric current can be passed, the rotor structure being moved angularly by the magnetic field in a direction to reduce the reluctance of the magnetic circuit of the actuator, one of said pole faces of each pair which are presented to each other being provided with a slot extending along at least part of the circumferential length of the face, said slot defining means for obtaining a desired torque/angle characteristic, said desired torque/angle characteristic being substantially constant as said rotor moves to reduce the reluctance of said magnetic circuit, said slot being of substantially uniform width and having a varying depth, said depth being at a maximum at minimum overlap of said faces of said pole element with said pole pieces, the depth of said slot being at a minimum when said faces of said pole elements and pole pieces are aligned.

11. An actuator as claimed in claim 10 in which the minimum depth of the slot is zero.

* * * * *